Oct. 23, 1923.
S. E. LORENZ
1,471,343
ANGLE DRILL
Filed June 23, 1921
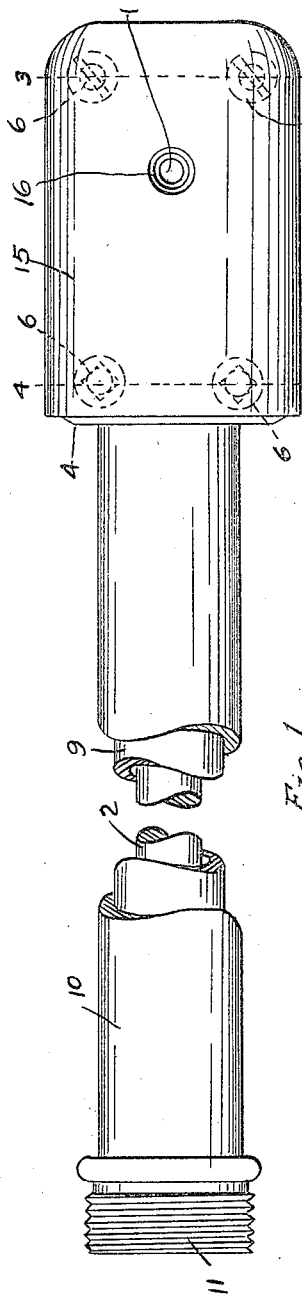
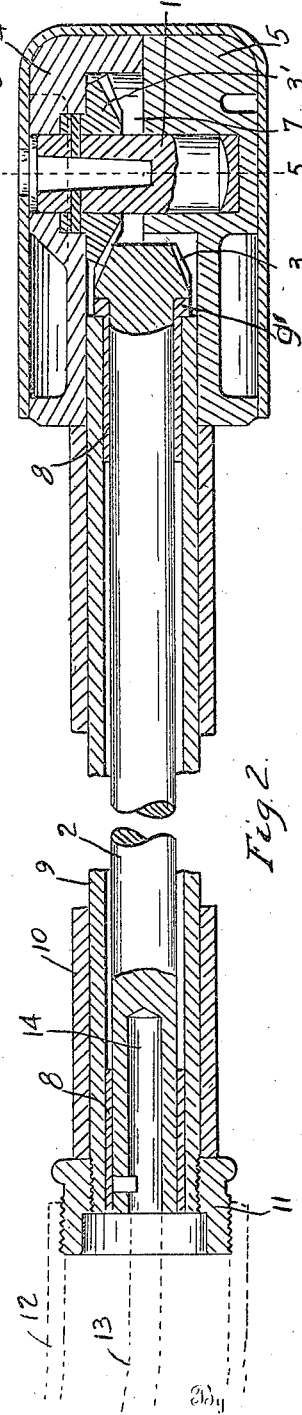
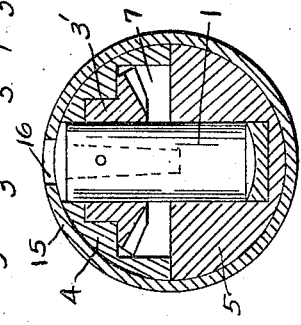
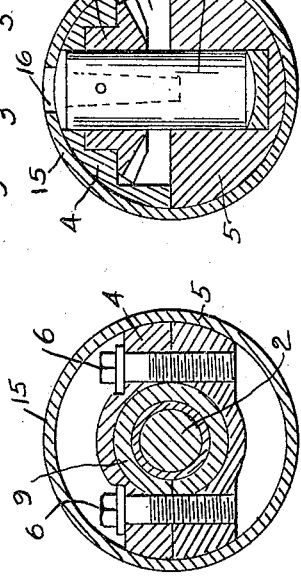
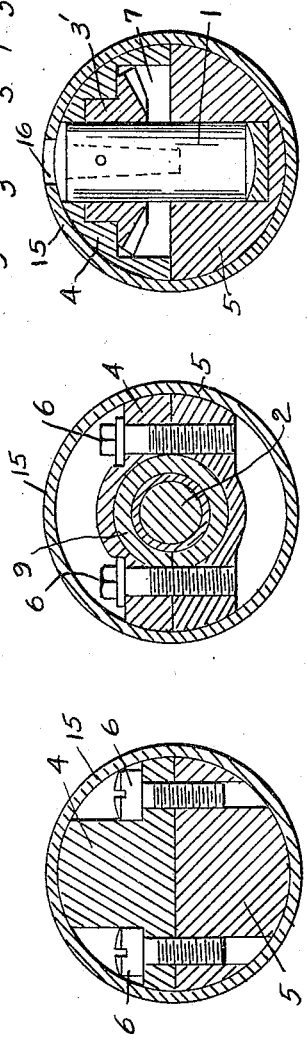
Inventor
Samuel E. Lorenz
Attorney Patented Oct. 23, 1923.

1,471,343

UNITED STATES PATENT OFFICE.

SAMUEL E. LORENZ, OF DETROIT, MICHIGAN, ASSIGNOR TO ELECTRIC WELDING MACHINE COMPANY, OF DETROIT, MICHIGAN, A COPARTNERSHIP FIRM.

ANGLE DRILL.

Application filed June 23, 1921. Serial No. 479,780.

*To all whom it may concern:*

Be it known that I, SAMUEL E. LORENZ, a citizen of the United States, residing at Detroit, in the county of Wayne and State of Michigan, have invented a new and useful Angle Drill, of which the following is a specification.

This invention relates to angle drills.

It is the object of the invention to provide an angle drill for use where the working space is restricted and particularly adapted for use in opening up sand holes or like defects in the interior walls of engine cylinders or in any part of a casting not accessible to an ordinary drill, preliminary to repairing such defects by welding.

In attaining this object the invention contemplates mounting a socket member for receiving a drill rotatively in the head of a tool, from which head there projects a handle within which is arranged a drive shaft for said socket, the axis of the latter being transverse to that of said shaft, and a pair of bevel gears being arranged in said head to actuate the socket member from said shaft.

A preferred embodiment of the invention is hereinafter described and illustrated in the accompanying drawing, wherein, Fig. 1 is a view in side elevation of the improved tool.

Fig. 2 is an axial sectional view of the same.

Fig. 3 is a cross section taken upon line 3—3 of Fig. 1.

Fig. 4 is a cross-section taken upon line 4—4 of Fig. 1.

Fig. 5 is a cross-section taken upon line 5—5 of Fig. 2.

In these views the reference character 1 designates a drill-receiving socket member, 2 a drive shaft for said member arranged transversely thereof, and 3—3′ a pair of bevel gears establishing the drive connection from said shaft to said socket member. The socket member 1 has the nature of a stub shaft, which is journaled in a two-part cylindrical head 4—5 transversely thereof, the complementary parts 4—5 of said head being abutted in a plane axial to said head and being clamped together by four tapscrews 6. One of said parts, as 4, is formed adjacent the other with a chamber 7 to receive the gear 3′. The end portions of the shaft 2 respectively engage journal bearings 8 having the nature of sleeves or bushings pressed into the ends of a tubular casing 9. One end portion of said casing extends into the head 4—5, and is clamped between the complementary parts thereof, as is best disclosed in Fig. 4. The gear 3 upon the shaft 2 engages a thrust bearing 9′ formed preferably integral with the bushing 8 in the adjacent end of the casing 9. Wear of said bearing may be taken up by adjusting the casing 9 further into the head 4—5.

A sleeve 10 formed of fibre or the like embraces the tubular casing 9 and forms a handle for the tool. Said sleeve is retained upon said casing by a nut 11 threaded upon the free end of the casing and externally threaded for engagement by the flexible tubular casing 12 of a flexible drive shaft 13, said parts 12 and 13 being indicated in dash lines in Fig. 2, the drive shaft 2 being formed at its outer end with a socket 14 into which the flexible shaft 13 may be inserted. Preferably a cylindrical sheet metal casing 15 will be snugly fitted over the head 4—5, the end of said casing being closed and the edge thereof rounded, said casing covering up the edges and shoulders of said head and thus minimizing the possibility of the tool catching on any shoulders within a cylinder or other engaged piece of work. An aperture 16 is formed in said casing in registration with the socket of the drill receiving member and permits the tool to be engaged with and disengaged from said socket.

It is to be noted that the socket member 1 of the described tool is mounted completely within the head 4—5 so as to minimize the amount of working space required by the tool. The cylindrical shape of the head is also a factor in reducing the requisite working space and adapts the tool particularly for use in restricted cylindrical spaces. The casing member 15 of the head covers up the edges and shoulders thereof and allows the tool to be moved about more freely and with less effort, in a restricted space. The entire construction is one that may be very quickly assembled or disassembled and which may be manufactured inexpensively.

What I claim is:

1. In an angle drill, the combination with a rotative socket member and a driving shaft for said member substantially transverse therewith, a two-part head in which the socket member is journaled, a tubular casing for said shaft adjustably embraced between the parts of said head, journal bearings for said shaft within the end portions of said casing, and gearing within said head actuating the socket member from said shaft.

2. In an angle drill, the combination with a rotative socket member and a driving shaft for said member substantially transverse therewith, a head comprising complementary parts in which the socket member is jointly journaled, a tubular casing for said shaft clamped between the members forming said head, and gearing within said head actuating the socket member from said shaft.

3. In an angle drill, the combination with a socket member and a driving shaft for said member substantially transverse therewith, a head comprising complementary parts in which said socket member is jointly journaled, a tubular casing for said shaft, clamped between the members forming said head, a pair of intermeshed bevel gears mounted within said head, respectively upon said shaft and socket member, and a thrust bearing for the gear on said shaft carried by the end of the casing adjacent said gear, the casing being adjustable longitudinally in the head to take up wear on said thrust bearing.

4. In an angle drill, the combination with a socket member, and a driving shaft for said member substantially transverse therewith, a head comprising complementary parts in which said socket member is jointly journaled, a tubular casing for said shaft, clamped between the members forming said head, a pair of intermeshed bevel gears mounted within said head, respectively upon said shaft and socket member, bushings within the ends of said casing providing journal bearings for said shaft, and a thrust bearing carried by one of said bushings engaged by the gear on said shaft, the casing being adjustable longitudinally to provide for taking up wear of said thrust bearing.

In testimony whereof I sign this specification.

SAMUEL E. LORENZ.